United States Patent
Bley

(10) Patent No.: US 7,156,976 B2
(45) Date of Patent: Jan. 2, 2007

(54) METHOD FOR DETECTING AND LOCALIZING LEAKS AND SUITABLE DEVICE FOR CARRYING OUT THE METHOD

(75) Inventor: Werner Grosse Bley, Bonn (DE)

(73) Assignee: Inficon GmbH (DE)

( * ) Notice: Subject to any disclaimer, the term of this patent is extended or adjusted under 35 U.S.C. 154(b) by 386 days.

(21) Appl. No.: 10/169,416

(22) Filed: Jun. 20, 2002

(65) Prior Publication Data
US 2003/0047465 A1 Mar. 13, 2003

Related U.S. Application Data

(63) Continuation of application No. PCT/EP00/11153, filed on Nov. 10, 2000.

(30) Foreign Application Priority Data

Dec. 14, 1999 (EP) ................... 19960174

(51) Int. Cl.
*G01M 3/20* (2006.01)
*G01M 3/22* (2006.01)

(52) U.S. Cl. ............... 205/784; 73/40.7; 73/49.3; 204/424

(58) Field of Classification Search .............. 73/40, 73/40.7, 49.2, 49.3; 205/782–785.5; 204/421, 204/424, 431
See application file for complete search history.

(56) References Cited

U.S. PATENT DOCUMENTS 4,470,882 A * 9/1984 Katsura et al. .......... 205/779.5
4,704,897 A    11/1987 Kawase et al.
4,768,371 A *  9/1988 Joshi ........................ 73/40.7
4,890,459 A *  1/1990 Havemann .................. 62/126
4,909,922 A *  3/1990 Kato et al. ................. 204/406
5,327,776 A *  7/1994 Yasui et al. ................ 73/49.2
5,365,772 A    11/1994 Ueda et al.
6,196,056 B1 * 3/2001 Ewing et al. ............... 73/40.7
6,286,362 B1 * 9/2001 Coffman et al. ............ 73/40.7
6,432,721 B1 * 8/2002 Zook et al. ................ 436/181

FOREIGN PATENT DOCUMENTS

| DE | 3506327 A1 | 9/1985 |
|---|---|---|
| DE | 3509195 A1 | 9/1985 |
| DE | 4325419 A1 | 2/1995 |
| GB | 2133552 A * | 7/1984 |
| JP | 63214635 A * | 9/1988 |
| JP | 01227036 A * | 9/1989 |
| JP | 10185752 A * | 7/1998 |

* cited by examiner

*Primary Examiner*—Kaj K. Olsen
(74) *Attorney, Agent, or Firm*—Peter J. Bilinski

(57) ABSTRACT

The invention relates to a method and a device for detecting leaks in the wall of a test object, container or similar, by measuring and evaluating changes that occur in a partial gas pressure. The invention aims to simplify the detection of leaks. To this end, changes that occur in partial pressures of oxygen are detected and evaluated using an oxygen sensor (4).

15 Claims, 2 Drawing Sheets

METHOD FOR DETECTING AND LOCALIZING LEAKS AND SUITABLE DEVICE FOR CARRYING OUT THE METHOD

CROSS REFERENCE TO RELATED APPLICATION

This is a continuation of international application PCT/EP00/111563, filed 10 Nov. 2000, the entire contents of which is herein incorporated by reference which designated the United States, and is now abandoned.

BACKGROUND OF THE INVENTION

1. Field of the Invention

The present invention relates to a method for detecting leaks in the wall of a test object, container or similar, by measuring and evaluating changes that occur in a partial gas pressure and a method for localizing the detected leak as well as devices for implementing said method.

2. Technical Background

It is known to search and, if required, determine leaks with the aid of test gases, preferably helium. To this end, the wall, which is to be analyzed for the presence of leaks, is exposed to a differential pressure. The partial pressure of the test gas is increased on the side at the higher pressure. If a leak is present, test gas will penetrate. On the side at the lower pressure, there is present a test gas leakage detector, commonly a mass spectrometer, which records the rise in the partial pressure of the test gas.

Mass spectrometers are relatively expensive and sensitive. They may only be operated at pressures of about $10^{-4}$ mbar or lower. The use of mass spectrometers necessitates, for this reason, an engineering- and financially-wise relatively high investment.

It is the task of the present invention to propose methods of the aforementioned kind as well as devices suited for implementing these methods in which the engineering- and financially-wise investment is reduced.

This task is solved by the present invention through the characteristic features of the patent claims.

The employment of oxygen as the test gas permits the use of oxygen sensors as the test gas detector. Preferably solid electrolyte $O_2$ sensors are employed. These are being employed for some time now, for example, in monitoring the exhaust gas discharged from the catalytic converters of vehicles. These sensors do not require a high vacuum to operate. When being implemented by way of a micro design they are linear over wide ranges, and above all sufficiently sensitive so that leakage detection according to the present invention can be performed at a sensitivity level comparable to that of helium leakage detection. The employment of oxygen as the test gas offers the additional advantage, that the user of this leakage detection method is informed specifically about the presence of this gas, namely $O_2$, which is of special importance in many applications.

Further benefits and details of the present invention shall be explained with reference to the examples of embodiments depicted in drawing FIGS. 1 to 4 and the methods described with reference to these.

SUMMARY OF THE INVENTION

One aspect of the present invention relates to a method for detecting leaks in the wall of a test object, container or a similar object. The method includes measuring changes that occur in a partial gas pressure of the interior of the container. The changes in the partial gas pressure are analyzed by determining changes in a concentration of oxygen, wherein the concentration of oxygen is determined and evaluated using an oxygen sensor.

Another aspect of the present invention relates to a device for detecting leaks in a wall of a test object, container, or similar object. The device includes a solid electrolyte oxygen sensor (4) disposed in the container. The sensor is configured to sense changes in a concentration of oxygen in the test object. A measurement instrument (6) is coupled to the solid electrolyte oxygen sensor. The measurement instrument is configured to use oxygen sensor output to measure changes that occur in a partial gas pressure of the interior of the container. An evaluation instrument (11) is coupled to the measurement instrument. The evaluation instrument is configured to transmit an indicator based on an output of the measurement instrument.

Another aspect of the present invention relates to a device for detecting leaks in a wall of a test object, container, or similar object. The device includes a vacuum pump coupled to an interior portion of the container. A solid electrolyte oxygen sensor (4) is disposed in the container. The sensor is configured to sense changes in a concentration of oxygen in the container. A measurement instrument (6) is coupled to the solid electrolyte oxygen sensor. The measurement instrument is configured to use oxygen sensor output to measure changes that occur in a partial gas pressure of the interior of the container. An evaluation instrument (11) is coupled to the measurement instrument. The evaluation instrument is configured to transmit an indicator based on an output of the measurement instrument.

Another aspect of the present invention relates to a device for detecting leaks in a wall of a test object, container, or similar object. The device includes a sniffer tip (23) disposed in the container. The container is filled with oxygen-free gas, or oxygen consuming gas, under over-pressure conditions. The sniffer tip is configured to obtain a gas sample. A chamber is coupled to the sniffer tip, whereby the gas sample is directed into the chamber. An oxygen sensor (4) is disposed in the chamber. The oxygen sensor is configured to detect oxygen in the gas sample. Means for measuring and evaluating changes that occur in a partial gas pressure of the interior of the container are coupled to the oxygen sensor.

Yet another aspect of the present invention relates to a device for detecting leaks in a wall of a test object, container, or similar object. The device includes a test chamber (31). The test object is disposed in the test chamber. The test object contains oxygen. Means for evacuating gas are connected to the test chamber. An oxygen sensor (4) is coupled to the means for evacuating gas, the oxygen sensor being configured to detect oxygen in the evacuated gas and produce measured values. Means for measuring and evaluating the measured values are coupled to the oxygen sensor, wherein the measured values are compared to predetermined empirically obtained values.

DETAILED DESCRIPTION

Figure 1:
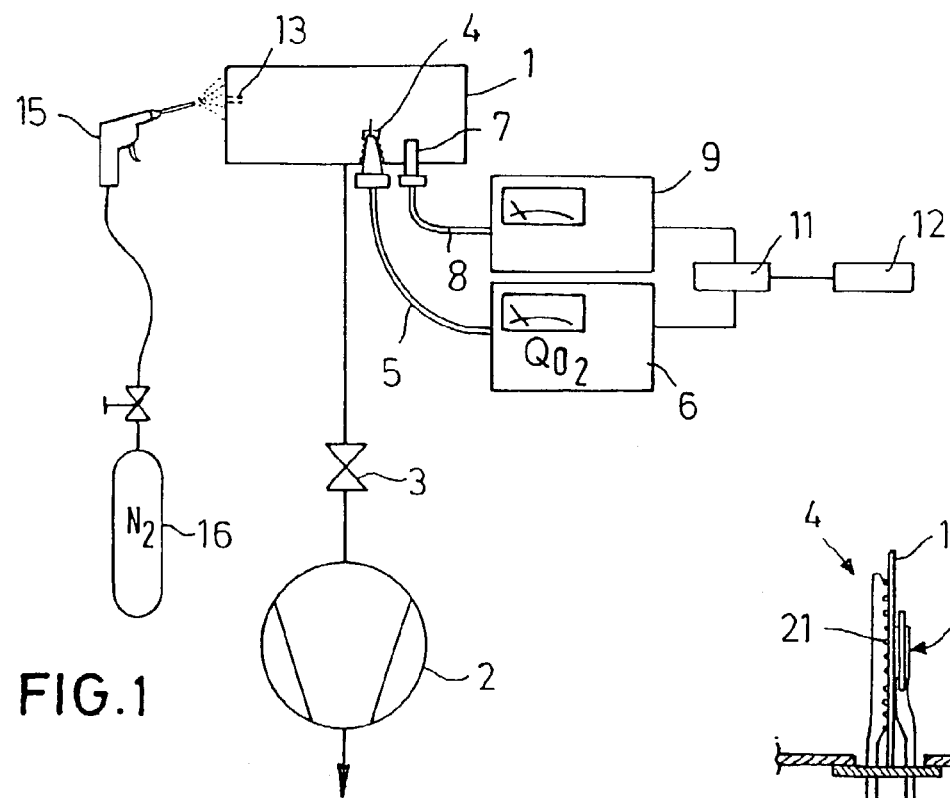
FIG. 1 is a diagram of a device for searching leaks and localizing leaks on a container at a low pressure.

In drawing FIG. 1, the container at a low pressure is designated as 1. Connected to the container 1 is the vacuum pump 2 via the valve 3. Located in container 1 is the oxygen sensor 4, which is linked via the line 5 to the recording instrument 6. Located in container 1 is in addition a pressure sensor 7, which is connected via the line 8 to the recording instrument 9. Connected to instruments 6 and 9 is an evaluation unit 11 which is linked to an alarm 12. A leak located in the wall of the container 1 is designated at 13.

If the leak 13 appears while container 1 is in the evacuated state, air will enter into the container 1. Thus the partial pressure of oxygen will change. This is determined by recording instrument 6, which in turn triggers a leakage indicator via evaluation unit 11. The pressure sensor 7 and the measuring instrument 9 permit an evaluation of the ratio between partial pressure of $O_2$ and total pressure, i.e. the $O_2$ concentration. If the oxygen concentration is above 15%, for example, then a leakage indicator can be triggered.

Furthermore, there exists the possibility of determining leaks 13 already effective and present during the evacuation of the container 1. This may be implemented, for example, in that the partial pressure of $O_2$ measured by the evaluation unit 11 at certain points of time during the evacuation process, is compared with the data of previous measurements recorded and saved for a leak-tight container 1.

The device depicted in drawing FIG. 1 furthermore comprises a spray gun 15, which is connected to a pressure reservoir 16 containing an oxygen-free gas, $N_2$, for example. If during a first phase of the measurement a leakage 13 has been determined in the wall of the container 1, the leakage may then be localized by locally spraying the container 1 with an oxygen-free gas. As the gas jet passes over the leakage 13, no $O_2$ will be able to enter during that time into the container 1. This will cause a brief drop in the partial pressure of $O_2$ in container 1 which is recorded by the $O_2$ sensor 4 and indicated by measuring instrument 6. Thus a direct correlation between the spraying process and the location of the leak 13 is given, so that a precise localization of the leakage will be possible.

The steeper the drop in the partial pressure of $O_2$ and/or the shorter the response time of the $O_2$ sensor is, the faster the leakage will be localized. The leak search and localization is thus particularly sensitive when the initial gas filling of the container 1 is free of oxygen. The drop in the partial pressure may furthermore be influenced by $O_2$ consuming gases being employed as the test gas. In the instance of such gases, for example, propane, butane or the like, $O_2$ is consumed at the hot surface of the $O_2$ sensor in the container 1 besides the displacement of $O_2$ in front of the leak 13, so that the measurement effect is amplified.

Figure 2:
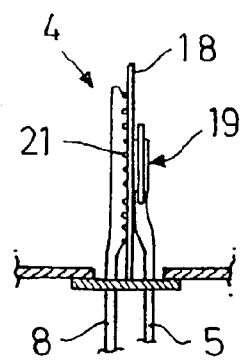
FIG. 2 is a diagram of a combined oxygen/pressure sensor.

In the embodiment in accordance with drawing FIG. 1, the $O_2$ sensor 4 and the pressure sensor 7 are separated. This separation can be dispensed with in the instance of solid $O_2$ electrolyte sensors, since these are commonly equipped with a heated filament. An $O_2$ sensor 4 of this kind is depicted in drawing FIG. 2. Both the $O_2$ sensor component 19 (for example, two platinum electrodes with solid electrolyte in between) and a heated filament 21 are affixed to a common support 18. The heated filament 21 is, in a basically known manner, part of a measurement bridge not depicted and has at the same time the function of a pressure sensor of a thermal conductivity vacuum gauge.

Figure 3:
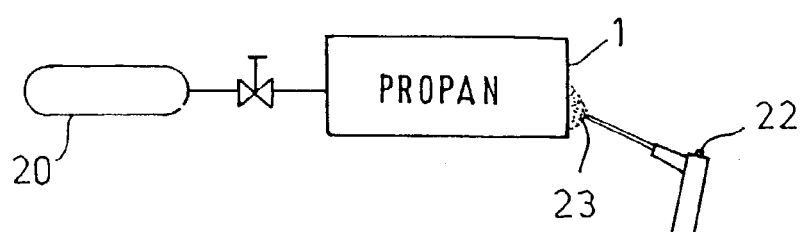
FIG. 3 is a diagram of a device for searching leaks and localizing leaks on a container filled with an oxygen-free gas and at an overpressure.
Figure 3:
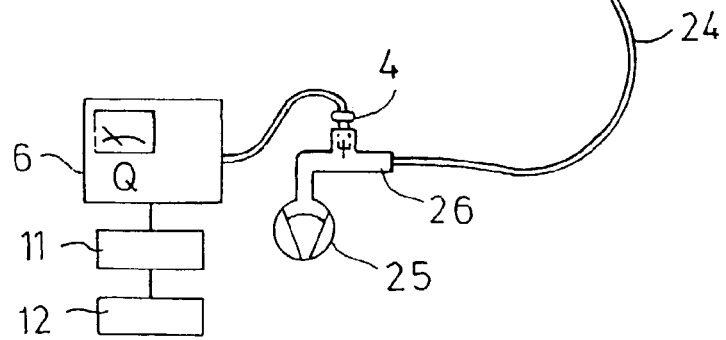

In the example of an embodiment in accordance with drawing FIG. 3, a container 1 filled with oxygen-free gas at an over pressure shall be analyzed as to the presence of leakages. The container 1 may be a reservoir vessel for the gas in each instance or a test object, which has been filled, for the purpose of leakage detection with the aid of a pressure reservoir 20, with the oxygen-free gas.

Leak search and localization are performed with the aid of a sniffer probe 22, the tip 23 of which is guided over the container 1. Connected to the sniffer probe 22 is a line 24, which is linked to the inlet side of a supply pump 25, a diaphragm pump, for example. On the way between sniffer probe 22 and the supply pump 25, the sucked in gas flow passes through a chamber 26 in which the oxygen sensor 4 is located, which—as in the embodiment in accordance with drawing FIG. 1 -supplies its signals via the line 5 to the measuring instrument 6.

As long as the sniffer probe 22 sucks in air, the sensor 4 will supply, owing to the oxygen contained in the air, a steady signal. As the sniffer tip 23 passes over a leak, the supply of oxygen is reduced or interrupted. As described for the localization of leakages in connection with the embodiment in accordance with drawing FIG. 1, the oxygen sensor 4 records any changes in the partial pressure of $O_2$ so that not only the presence of the leakage but also its location is detectable. Also, in the instance of this method, the measurement effect is amplified when $O_2$ consuming gases are present in the container or the test object 1.

Figure 4:
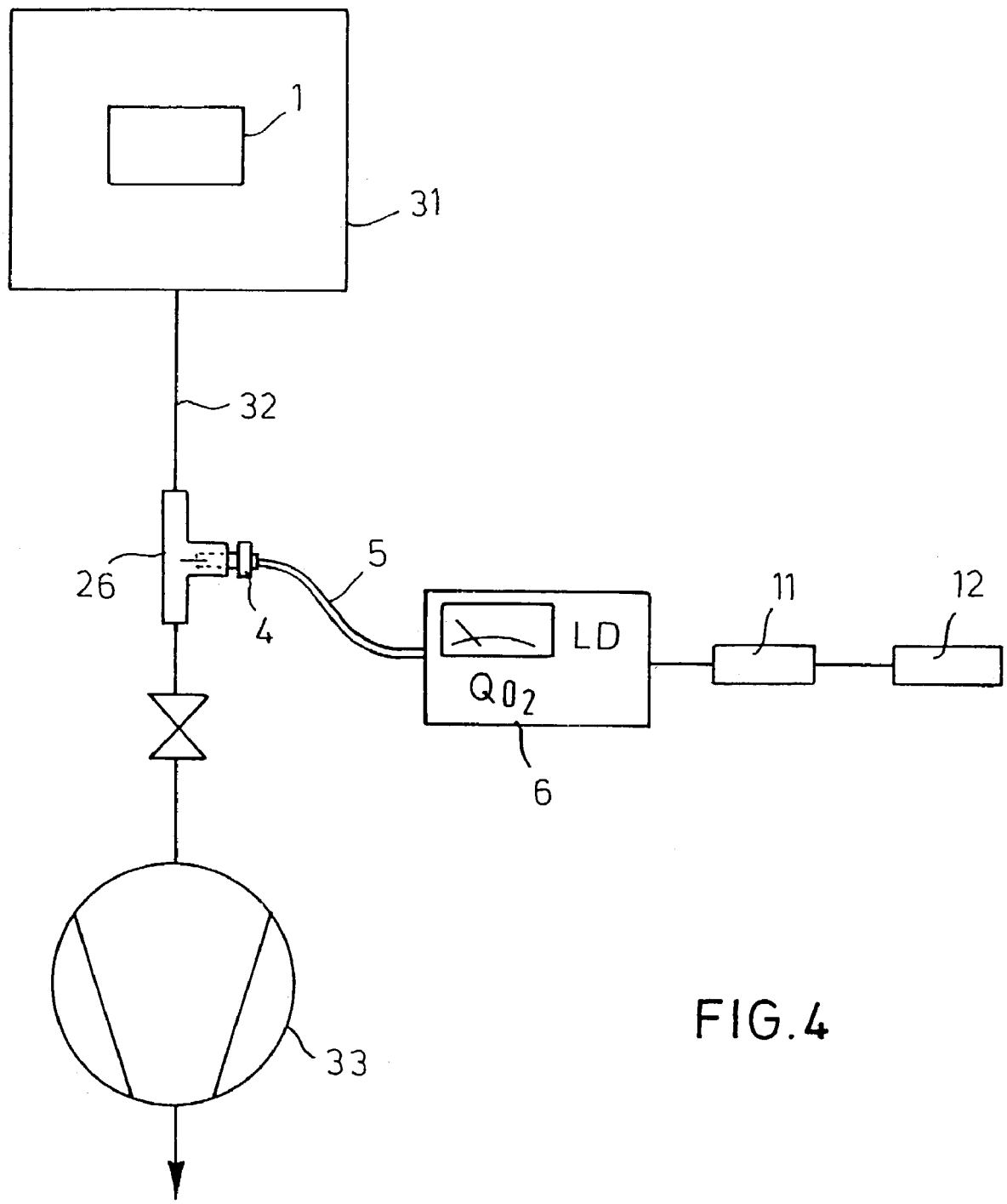
FIG. 4 is a diagram of a device for integral leak searching on test objects which are filled with an oxygen containing gas.

Depicted in drawing FIG. 4 is an embodiment in which an integral leakage test is performed in a test chamber 31 on a test object 1 filled with oxygen containing gas. In a manner which is basically known, the test chamber 31 is evacuated via the line 32 by the vacuum p ump 33. The chamber 26 with the $O_2$ sensor is located in the line 32. If during the evacuation process $O_2$ escapes from the test object 1, this oxygen flows through the chamber 26 and is recorded by sensor 4 and the measuring instrument 6. As detailed, a comparison of the measurement results with previous measurements on leak-tight test objects 1 can effect improved leakage detection results. This aim is also attained by purging the test chamber with oxygen-free gas after having introduced the test object 1, so that oxygen present in the air will not adversely affect the leakage searching process.

What is claimed is:

1. A method for finding and localizing leaks in the wall of an evacuated test container, using oxygen as a testgas, the method comprising the steps of:
   measuring changes that occur in a partial gas pressure of the interior of the container; and
   analyzing the changes in the partial gas pressure by determining changes in a concentration of oxygen;
   wherein the concentration of oxygen is determined and evaluated using an oxygen sensor and a total pressure sensor allowing an evaluation of the ratio between the partial pressure of the oxygen and the total pressure in the container; and
   wherein for the purpose of localizing the leakage, the outside of the test container is sprayed with ajet of gas that is free of the oxygen testgas.

2. The method according to claim 1, including the step of employing an oxygen consuming (oxidizable) gas including at least one of propane and butane as the sprayed gas.

3. The method according to claim 1, including the step of employing solid electrolyte $O_2$ sensors as said oxygen sensors.

4. The method according to claim 1, including the step of locating said oxygen sensor within the container.

5. The method according to claim 1, wherein the gas evacuated from the container flows through a chamber in which the oxygen sensor is located.

6. The method according to claim 1, including the step of measuring partial pressure values of $O_2$ at certain points of time, and comparing the measured values with values that are measured under the same conditions on leak-tight containers.

7. A device for detecting leaks in a wall of a test container, wherein oxygen is used as a test gas, the device comprising:
   a vacuum pump coupled to an interior portion of the container;
   an oxygen sensor, said oxygen sensor being a solid electrolyte oxygen sensor;
   a total pressure sensor, said total pressure sensor being located in proximity of the oxygen sensor;
   a spray gun containing one of oxygen-free and an oxygen consuming (oxidizable) gas for the purpose of leakage localization;
   a first measurement instrument coupled to the oxygen sensor, the measurement instrument being configured to use oxygen sensor output to measure changes that occur in a partial gas pressure of oxygen in the interior of the container;
   a second measurement instrument coupled to the total pressure sensor, the second measurement instrument being configured to use pressure sensor output to measure changes that occur in the total gas pressure of the interior of the container; and
   an evaluation instrument coupled to said first and second measurement instruments, the evaluation instrument being configured to transmit an indicator based on the outputs of the measurement instruments.

8. A device according to claim 7, wherein the oxygen sensor and the total pressure sensor are disposed in the container.

9. The device according to claim 7, wherein the oxygen sensor includes a heated filament, said filament being used as a pressure sensor.

10. A method for detecting leaks in the wall of a test container wherein leakages are detected in the wall of a container filled with at least one of an oxygen-free and an oxygen consuming (oxidizable) gas under overpressure, said method including the steps of:
   sniffing said container with the aid of a sniffer tip, wherein the oxygen, being a component of the ambient air, is used as a testgas; and
   analyzing the gas sucked in by the sniffer tip for the partial presence of oxygen with the aid of an oxygen sensor, wherein the determination of a leak is made through a measured decrease of the testgas concentration.

11. The method according to claim 10, wherein said oxygen consuming (oxidizable) gas is one of propane and butane.

12. The method according to claim 10, wherein the gas sucked in by the sniffer tip flows through a chamber in which the oxygen sensor is located.

13. The method according to claim 10, wherein solid electrolyte $O_2$ sensors are employed as the oxygen sensor.

14. The method according to claim 10, including the step of measuring partial pressure values of $O_2$ at certain points of time and comparing said partial pressure values with values measured under the same conditions on leak-tight containers.

15. The method according to claim 14, wherein in addition to the partial pressure measurements being made with the aid of the oxygen sensor, total pressure measurements are performed with the aid of a pressure sensor, said measurements being taken into account in an evaluation of the concentration.

* * * * *